MESSAGE ASSEMBLY AND DISTRIBUTION APPARATUS

Filed Dec. 28, 1962 2 Sheets-Sheet 1

INVENTORS
JOHN GURAL
ALMERIN C. O'HARA, JR.
ROBERT E. RIFFENBURG

BY George C. Kustom
AGENT

Oct. 25, 1966 J. GURAL ET AL 3,281,795

MESSAGE ASSEMBLY AND DISTRIBUTION APPARATUS

Filed Dec. 28, 1962 2 Sheets-Sheet 2

United States Patent Office 3,281,795

Patented Oct. 25, 1966

3,281,795

MESSAGE ASSEMBLY AND DISTRIBUTION APPARATUS

John Gural, Rhinebeck, Almerin C. O'Hara, Jr., West Hurley, and Robert E. Riffenburg, Woodstock, N.Y., assignors to International Business Machines Corporation, New York, N.Y., a corporation of New York Filed Dec. 28, 1962, Ser. No. 247,940
5 Claims. (Cl. 340—172.5)

This invention relates to apparatus for data transmission. More particularly, the invention relates to apparatus for assembling, from a train of serially received "bits," a plurality of variable length messages (variable number of bits per message), and, for distributing these variable length messages, to selected ones of a plurality of destinations.

The invention described herein was made in the performance of work under a NASA contract and is subject to the provisions of the National Aeronautics and Space Act, Public Law 85-568 (72 Stat. 426; 42 U.S.C. 2457), as amended.

The need for so-called "message assembling" frequently arises when it is desired to match the characteristics of a data source with a data sink. The data source may be a telephone line carrying a teletypewriter message, while the data sink may be a digital computer or the like. Frequently, the respective demands placed on both the data source, and the data sink, cause them to operate in essentially different, hence incompatible, manners. For example, a data source may be transmitting data in a serial fashion, while the data sink is adapted to process data only in a parallel fashion.

Accordingly, it is an object of this invention to provide new and improved apparatus for assembling data furnished by a serial source, and, for transmitting the assembled data in parallel.

Normally, the problem of providing apparatus for coping with the different natures of a data source and a data sink involves more than merely message assembly. Quite often, the problem of message distribution also presents itself in the same context as message assembly. For example, where successively assembled messages denote different aspects, such as altitude, speed, and heading, of a rocket launching operation, separate terminal devices (e.g., display scopes) would be required to monitor each one of these individual aspects separately.

Accordingly, it is another object of this invention to assemble messages from a serial data stream and route these assembled messages, in parallel form, to a plurality of different terminal devices.

Frequently, when an entire stream of serial bits represents a number of different variables, it is advantageous to process the serial bits in block form, rather than bit by bit. This is normally done by "breaking up" an entire data stream of serial bits into a succession of time frames, within which all digital information relating to a particular variable will be transmitted. Successive time frames are thus allocated such that each variable has its own time frame. If, as is generally the case, the number of bits needed to accurately represent a particular variable is different for each variable, maximum utilization of any data transmission system demands messages of variable lengths. Limiting the size of the time frames (i.e., the lengths of the messages) to either a maximum or a minimum length, involves, on the one hand, waste of precious system time in those cases where a lesser number of bits accurately represent a particular variable, or, on the other hand, inaccurate representation of variables where more bits are needed to accurately represent a particular variable. Neither alternative is desirable.

Accordingly, it is another object of this invention to assemble, from a train of serially received bits, successive variable length messages.

It is still another object of this invention to assemble, from a train of serially received bits, a plurality of variable length messages, and to distribute these variable length messages to predetermined ones of a plurality of terminal devices.

While prior art apparatus is generally known which accomplishes some of the above objects, their general complexity leads to serious drawbacks in so-called "real time" applications, where data is continuously transmitted by a data source as of the moment that a given phenomenon occurs. The data is not repeated later, so that once data is lost, it is irretrievably gone. The evanescence of the data thus places very high demands on the reliabilty of message assembly and distribution apparatus operating in "real time." Every message must be correctly assembled and must be correctly distributed when and as received; there is no opportunity to "do it later."

Accordingly, it is another object of this invention to provide highly reliable apparatus for assembling, from a train of serially received bits, successive messages of variable length, and for distributing successively assembled messages to selected ones of a plurality of terminal devices.

It is still another object of this invention to provide apparatus for assembling and distributing messages, which utilizes a minimum number of electronic components.

In accordance with the invention, a serial data stream which comprises successive frames whose length is predetermined and known, is applied to an assembly register. The assembly register receives each bit of the data stream and, as the bits accumulate in the assembly register, a message assembly begins. A bit counter is provided to count the number of bits currently received by the assembly register so that the bit counter contents at any one time represent the number of bits which the assembly register has accumulated.

There is also provided a second counter, called a terminal counter, which by the contents stored in it at any one time selects a particular one of a plurality of terminal devices. The outputs of both the bit and the terminal counter are transmitted to a matrix which issues a signal whenever the number of bits currently stored in the assembly register has reached a value which is characteristic of the message length to be received by a particular terminal device as selected by the terminal counter.

After the matrix issues a signal, indicating that a message has been assembled for one of the terminal devices, the assembly register discharges its contents onto a data bus for routing to the selected terminal device, while the bit counter is reset to an initial count to begin counting the assembly of a new message. Similarly, the terminal counter is incremented by a fixed count to indicate a new terminal device which is to receive the next message, when it has been assembled.

The foregoing and other objects, features and advantages of the invention will be apparent from the following more particular description of a preferred embodiment of the invention, as illustrated in the accompanying drawings.

Figures 3A, 3B, 3C, 4A, 4B, 4C:
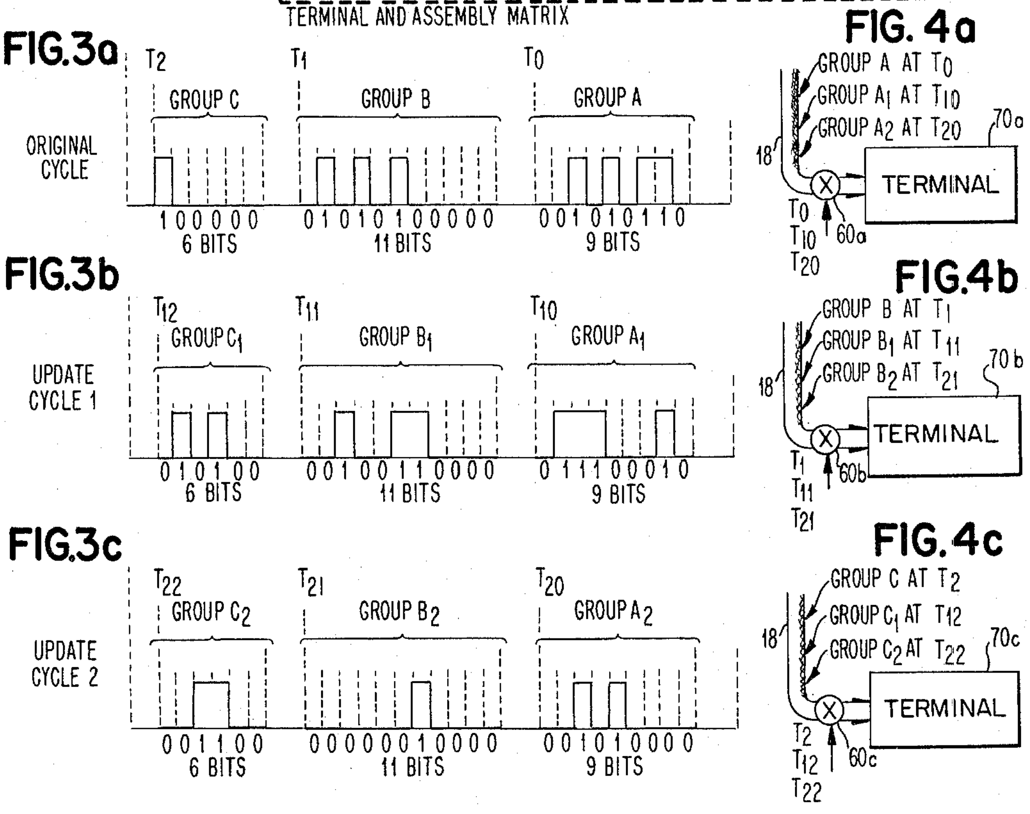

FIGS. 3*a*, *b* and *c* are diagrams showing typical waveforms of three successive cycles of serial information.

FIGS. 4*a*, *b* and *c* are diagrammatic illustrations of messages being distributed to a plurality of terminals.

*General structure*

Figure 1:
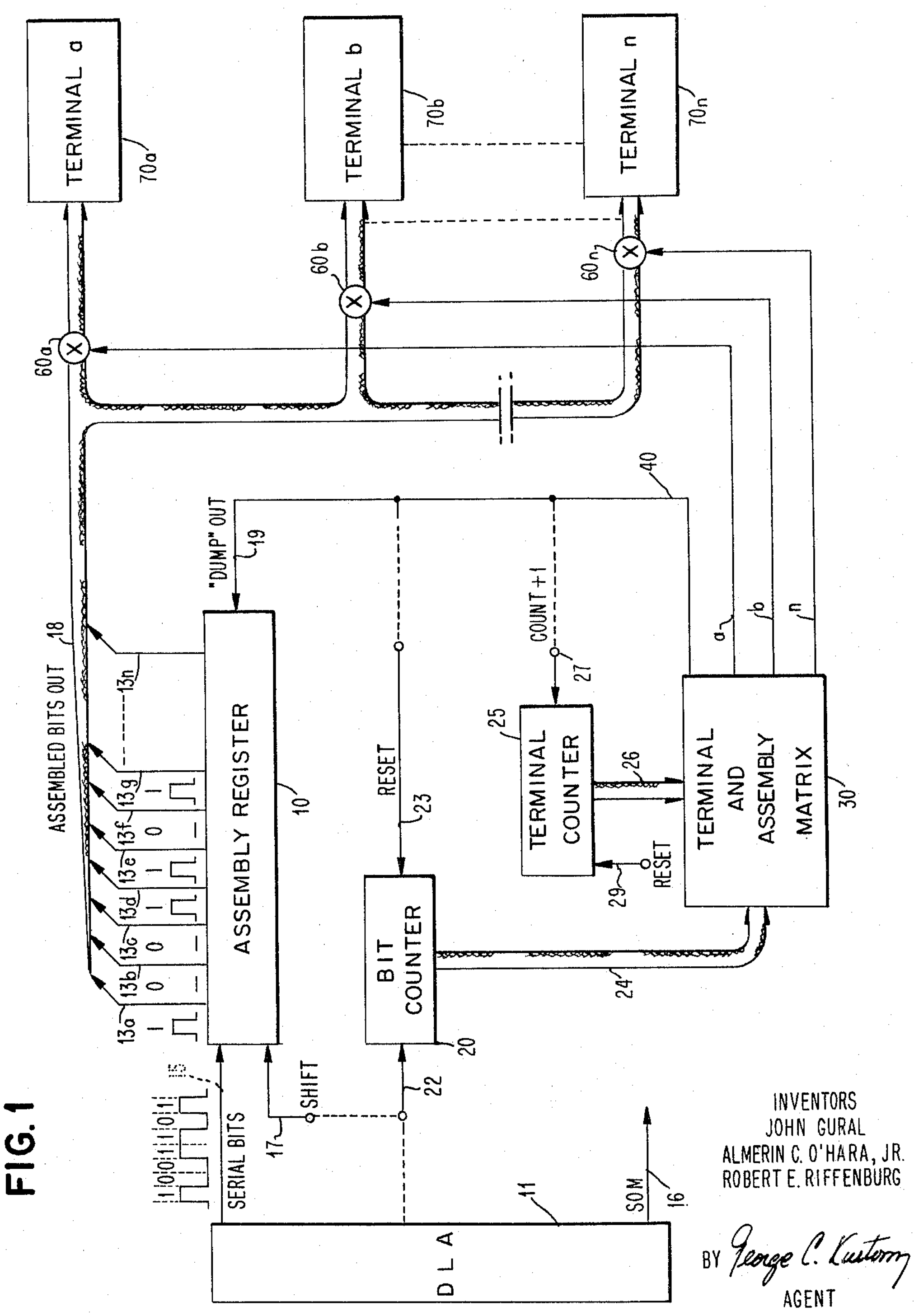
FIG. 1 is a generalized block diagram of the invention.

Referring now to FIG. 1, there is shown apparatus embodying the invention. Multi-stage assembly register 10 receives serial bits on input data line 15 from a data line amplifier 11. Briefly, data line amplifier 11 functions generally to convert the form of the signals on a telephone line or the like, into a form suitable for use, e.g., by a digital computer. The data amplifier may be a data line amplifier MEC 71–8A as manufactured by Milgo Electronic Corporation of Miami, Florida. In addition to providing serial bits on data line 15, the data amplifier 11 also has a line 16 which furnishes a special SOM (start of messages) signal whose function will be described hereafter.

Line 15 is connected to the highest order stage of assembly register 10. The output of register 10 is provided, in parallel, on output lines 13*a*–13*n*, to a data bus 18. Assembly register 10 is provided with two additional signal inputs, a shift signal input on line 17, and a "dump-out" signal input on line 19. Assembly register 10 receives shift pulses on line 17, as will be described in more detail below, once for every time interval during which serial data bits are received on terminal 15. Each shift signal applied to assembly register 10 causes the received bits to be shifted to the next order stage in register 10, in the direction of stage *n*.

A bit counter 70, which may be a well-known counter of the "ring" type, receives count pulses on line 22, as will be described hereafter, to advance bit counter 20 each time that a count pulse is received on line 22. As shown in FIG. 1, the shift pulses applied to assembly register 10 (on line 17) and the count pulses applied to bit counter 20 on line 22, have a fixed relationship which will be described hereafter. Bit counter 20 also receives reset signals via line 23 as will be hereinafter described. The output of bit counter 20 is transmitted, via a wire bundle 24, to a terminal and assembly matrix 30.

A terminal counter 25, which may be a ring counter, receives count signals via line 27 and also receives reset pulses via line 29 as will be described in more detail hereafter. The output of terminal counter 25 is transmitted, via a wire bundle 26, to the terminal and assembly matrix 30.

The output of terminal and assembly matrix 30 is transmitted, via a plurality of lines "*a–n*," to a plurality of gates 60*a*–60*n*, which service a plurality of terminal devices 70*a*–70*n*. Matrix 30 also provides an output on line 40 which is coupled to the above-mentioned inputs of assembly register 10, bit counter 20, and terminal counter 25.

*General operation*

As each bit from the serial train of information coming in on data line 15 is received by the high order of assembly register 10, a shift pulse on line 17 causes register 10 to move the received bit one order downward in the register. As successive bits arrive on data line 15, successive shifts of assembly register 10 continually result in the high order of assembly register 10 being "empty" for reception of a next successive bit. The number of shifts which are performed by assembly register 10, in transferring the received bits downward in the register, are counted by bit counter 20 which, on its output, thereby indicates the currently received number of bits in assembly register 10.

Matrix 30 receives the output of bit counter 20 and also the output of terminal counter 25 and, when the number of bits received by assembly register 10 (as counted by bit counter 20) has reached the number of bits which constitute a "message" to be sent to a selected terminal device, matrix 30 issues a signal on line 40 which is applied, via line 19, to assembly register 10. This signal on line 19 causes assembly register 10 to "dump" its contents onto a data bus 18, in parallel. Shortly after the appearance of a "dump-out" signal on line 19 the terminal counter 25 is advanced by a fixed increment, and the bit counter 20 is reset to an initial count, which in the present case is preferably a zero initial count.

While the output signal from matrix 30 has caused the assembly register 10 to be "dumped," and just before the terminal counter 25 is advanced and the bit counter 20 is reset, it has also issued a signal on a particular one of the output lines "*a–n*" to open one of the gates 60*a*–60*n* to thereby gate the information signals now present on data bus 18 to one of the selected terminal devices 70*a*–70*n*, for example terminal device 70*a*.

The next cycle of events again causes assembly register 10 to assemble bits until assembly register 10 has again received a number of bits which constitute a new "message" which is to go to a newly selected terminal device. Thereafter, the assembly register 10 is again "dumped" onto the data bus 18, and the information is gated to a new terminal device, for example 70*b*. Thereafter, bit counter 20 is reset to an initial count of zero to again start counting the number of bits which will be received by assembly register 10, and terminal counter 25 is advanced to a new count to indicate the next successive terminal device that is to receive the next message when it has been assembled.

After an entire train of serial bits has thus been broken up into successive variable length messages, the terminal counter 25 is reset, as will be more particularly described hereafter, so that upon reception of a new serial train, the terminal devices 70*a*–70*n* will again be successively serviced by messages assembled in assembly register 10.

*Detailed structure*

Figure 2:
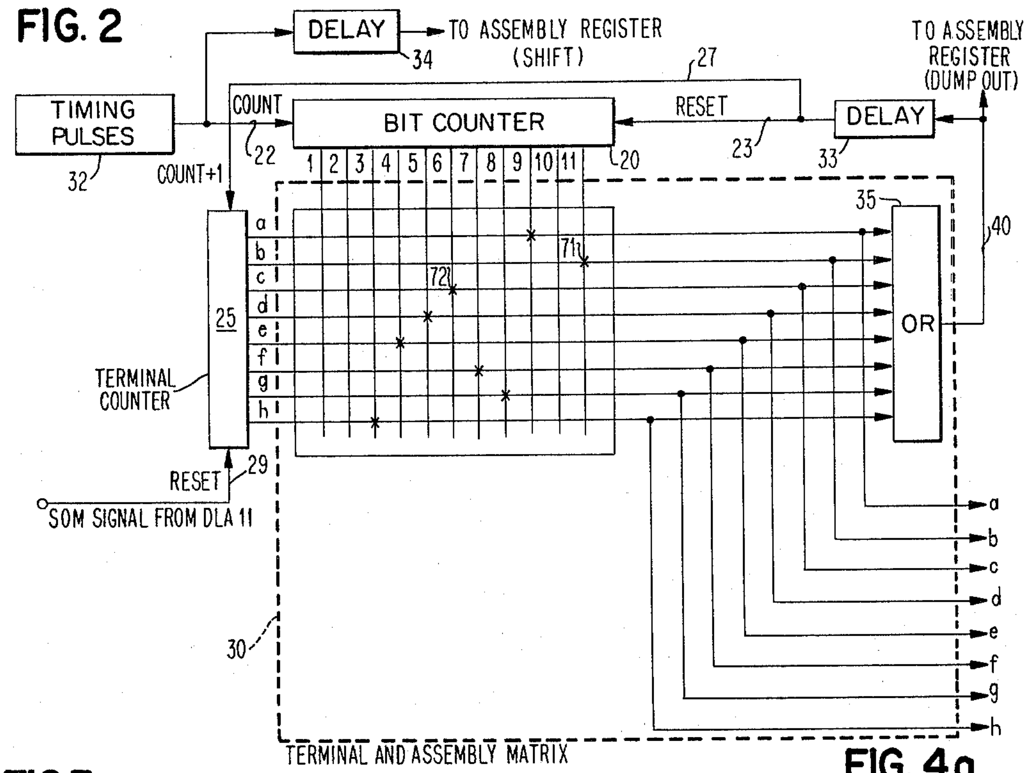
FIG. 2 is a detailed block diagram of circuitry shown in FIG. 1.

Referring to FIG. 2, there is shown a source of timing pulses 32 which applies pulses to both bit counter 20, via line 22, and a delay circuit 34. The amount of delay provided by delay circuit 34 will be described in more detail below. Source 32, which is normally a part of the data amplifier 11, transmits timing pulses which occur at regular intervals in synchronous fashion with the arrival of data bits on line 15 of FIG. 1. Therefore, as each data bit is received by assembly register 10, whether it be a binary "one" or "zero," each timing pulse from 32, as delayed by the delay circuit 34, is thereafter applied to assembly register 10 to cause the register 10 to shift all bits stored therein one order downward. Bit counter 20 is incremented by one upon receipt of each timing pulse.

Matrix 30 is shown for illustration as receiving outputs 1–11 of bit counter 20, and outputs "*a–h*" of terminal counter 25. For purposes of illustration, it has been assumed that there are 8 terminal devices (as represented by counter terminals "*a–h*" of terminal counter 25) and the maximum message length encountered is 11 bits (as represented by output terminals 1–11 of bit counter 20). It is clearly within the scope of the invention, however, to choose the respective counter capacities so that any number of terminal devices and any number of message lengths can be accommodated.

The outputs of bit counter 20 and terminal counter 25 are shown to intersect at selected locations within matrix 30, as denoted by crosses. These crosses schematically represent a conventional AND gate, well known to those skilled in the art. The inputs to each one of these AND gates are furnished respectively by the bit counter 20 and the terminal counter 25. For example, there is shown an intersection, denoted by a cross, between the bit counter terminal 9 and the terminal counter output "*a*." In effect, this means that terminal device 70*a* is to receive 9-bit messages. Similarly, with reference to matrix 30 and the crosses therein, terminal device 70*b* receives 11-bit messages, while terminal device 70*e* receives 4-bit messages, and terminal device 70*h* receives 3-bit messages, etc.

Assume that the terminal device 70*a* has just been serviced and that a 9-bit message has been admitted thereat, and that terminal counter 25 has been advanced to indicate the selection of terminal device 70*b*, by having a signal on line "*b*." As each serial bit is received by assembly register 10, bit counter 20 increments by one and hence it indicates the number of bits received by assembly register 10. Bit counter 20 counts bits received by register 10 until 11 bits are assembled, which is indicated by line 11 of bit counter 20 having a signal thereon. At this time, AND gate 71 receives its necessary two inputs and issues an output signal which is applied to OR gate 35. OR gate 35, in turn, transmits an output signal on line 40 which is applied, through a delay circuit 33, to bit counter 20 to reset it to an initial zero count. Similarly, the delay output signal from OR gate 35, as delayed by delay circuit 33, is also applied to terminal counter 25 to cause it to advance to a new count, an output on terminal *c*. The undelayed output signal from OR gate 35 is applied to assembly register 10 to cause it to discharge its contents onto the data bus 18, while the output of AND gate 71 is applied, via line "*b*," to the sampling gate **60*b* (FIG. 1) which is thereby opened and causes the data on data bus 18 to be read into terminal device 70*b***.

Thereafter, assembly register 10 again receives data bits on data line 15 until 6 bits have been received, when coincidence is achieved at AND gate 72, which receives inputs from the 6 position of bit counter 20 and the "*c*" position of terminal counter 25. The output from AND gate 72 causes the 6 bit message to be read into terminal device **70*c*** in a manner as described above. Successive messages of variable lengths are similarly applied to the successive terminal devices.

After all terminal devices have been serviced, a new series of messages on data line 15 will be preceded by a SOM (start of messages) signal which causes the data line amplifier 11 to emit a signal on its SOM line 16. The signal on line 16 of data amplifier 11 is coupled to the reset terminal 29 of terminal counter 25, which is thereby reset to its initial state so that terminal device **70*a*** may again be serviced by the first assembled message.

The purpose of delay circuits 33 and 34 will now be briefly described. Delay circuit 34 delays signals from source 32 for an amount which is no longer than the interval between successive bits on data line 15 (FIG. 1) but which is sufficiently long so that the shift signal from delay circuit 34 does not precede a possible corresponding "dump-out" signal from OR gate 35. This guarantees that the bits stored in register 10 are not shifted when they in fact, in their presently stored order, represent the true message.

Similarly, delay circuit 33 delays signals from OR gate 35 for an amount which is no longer than the interval between successive bits on data line 15 (FIG. 1) but which is sufficiently long so that the contents of the assembly register 10 are discharged onto the data bus 18 and gated to the selected terminal device before the contents of bit counter 20 and terminal counter 25 are changed. Premature change of the contents of bit counter 20 and terminal counter 25 would remove the signals used to gate the information on data bus 18 to the selected terminal device.

*Detailed operation*

Referring now to FIGS. 3*a*–3*c*, and FIGS. 4*a*–4*c*, FIGS. 3*a*–3*c* show the nature of the serially received data bits during an original cycle, an update cycle 1, and an update cycle 2, while FIGS. 4*a*–4*c* illustrate the distribution of messages to three terminal devices. The words "update cycle" are used to indicate that the data is, as previously described, in "real time" so that successive cycles of information carry the messages in predetermined order to indicate the continuously changing variables. Thus, an entire data transmission may comprise an original cycle, followed by several update cycles, for example, update cycle 1 followed by update cycle 2. Within each cycle, the occurrence of the frames allocated to each variable is predetermined and known. Thus, for example, referring to FIG. 3*a*, a group A message of 9-bit length is followed by a group B message of 11-bit length, etc.

The group A message is assembled as follows: terminal counter 25 is set to select terminal device **70*a* (as previously described) while bit counter 20 counts the number of bits currently received by assembly register 10. As soon as the count of bit counter 20 reaches the 9 position, at T 0, assembly register 10 is caused to "dump" its contents onto data bus 18 and sampling gate 60*a* of terminal 70*a* is opened at T 0 to admit the message group A into terminal device 70*a***.

Similarly, the group B message is assembled as follows: terminal counter 25 has been advanced by a fixed count after the discharge of message group A, to a new count, which is to select terminal **70*b*. When bit counter 20 reaches a bit count of 11, at T 1, assembly register 10 "dumps" the assembled message onto data bus 18. At the same time T 1, sampling gate 60*b* of terminal device 70*b* is opened to admit the group B message to terminal 70*b***.

After the group B message has been dumped to terminal device **70*b*, message group C is similarly applied to terminal 70*c***. For purposes of illustration, a sequence has been described with only three message groups serving only three terminal devices. This illustration, however, in no way limits the invention to the particular number of message groups and terminal devices.

After message groups A, B and C have been distributed to respective terminal devices **70*a*, 70*b* and 70*c*, an update cycle 1 follows the original cycle. Again, the update cycle is characterized by "frames," in which the first 9 bits constitute a group A1 message which is entered into terminal device 70*a* at T 10. Thereafter, when the next 11 bits have been received in assembly register 10, a group B1 message is entered into terminal device 70*b* at T 11. Subsequently, a group C1 message is read into terminal 70*c* at T 12. These operations all occur in a manner as described above. That is, for the assembly of any one message, the bit counter after having been reset at the end of the previous message assembly, counts the number of bits received by the assembly register and causes the assembly register 10** to dump its contents onto a data bus when the required number of bits, to assemble a message, has been received.

After group A1, group B1, and group C1, messages have been read into respective terminal devices **70*a*–70*c*, a second update cycle 2 follows the update cycle 1**.

Again, the received serial bits are broken up in terms of a first "frame" group (group A2) comprising 9 bits, and a second "frame" (group B2) comprising 11 bits, and a third "frame" (group C2) comprising 6 bits. These respective groups are entered into terminal devices **70*a*–70*c* at respective times T 20, T 21, and T 22**.

*Other modifications*

While the invention has been described with reference to a preferred embodiment thereof which utilizes a shift register as the assembly register, it will be apparent to those skilled in the art that the present invention is not so limited. For example, an ordinary storage register may be employed, with a set of gates, one gate for each storage position of the storage register. Each successive gate in the gate is half-conditioned by the advance of a ring counter, counting in synchronism with the arrival of data bits, while the entire serial data stream is applied to all of the gates in the gate set. Thus, each successive data bit is entered, or gated, into successive positions of the storage register. As soon as the number of bits stored in the storage register, as counted by the bit counter, reaches a number which characterizes the message length that is to go to the selected terminal device (this is determined by the terminal and assembly matrix), the storage register contents are discharged onto the data bus. Thereafter, the operation proceeds as previously described.

Further, while the invention has been described with reference to a matrix wherein the connections were so constructed that only one terminal device was capable of receiving a particular bit length message, it should be realized that it is clearly within the scope of the invention to service more than one terminal device with the same message, or, to service the same terminal device with different length messages. This would only involve the insertion of additional AND gates into the matrix and providing each AND gate with the desired outputs of the bit counter—to indicate the message length—and the outputs of the terminal counter—to indicate the desired terminal device.

In summary, the message assembly and distribution apparatus of the invention receives a train of serial bits of predetermined format and assemblies successive variable length messages which are automatically distributed to selected ones of a plurality of terminal devices. A bit counter counts the number of bits received by an assembly register, while a terminal counter indicates successive terminal devices which are to receive the assembled messages. A matrix receives the outputs of both the bit counter and the terminal counter and issues signals which indicate when a message has been assembled. Thereafter, the message is routed to a selected terminal device. The message assembly and distribution has been carried out with equipment which is simple and economical, thereby greatly facilitating use of the apparatus of the invention in "real-time" applications, where it is necessary that all serial bits received be formed into messages and that all messages be distributed to their selected terminal devices.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In combination with a plurality of terminal devices, a message assembly and distribution apparatus for assembling, from a train of serially received data representing bits, successive variable length messages and, for distributing said variable length messages to selected ones of said plurality of terminal devices, comprising:

an assembly register, for receiving each bit of said train of serial bits;

a bit counter for counting the number of bits currently received by said assembly register, said bit counter having a plurality of outputs, each output indicating different bit lengths of messages to be assembled;

a matrix including a plurality of AND gates, at least one AND gate for each terminal device;

a terminal counter for selecting, by each different count, a different one of said plurality of terminal devices, said terminal counter having a plurality of outputs;

means connecting each different output of said terminal counter to a different one of said AND gates, said means also connecting to each AND gate those outputs of the bit counter that indicate a count equivalent to the bit length of messages destined for the terminal device associated with a particular AND gate, whereby a particular AND gate is actuated to issue a control signal upon the coincidence thereat of both a bit counter and a terminal counter output; and means responsive to said control signal for dumping the contents of said assembly register to the terminal device selected by said terminal counter.

2. Apparatus according to claim 1, wherein said assembly register is a shift register.

3. Apparatus according to claim 2, including:

means for successively shifting each data representing bit received by said assembly register one order downwardly in said register.

4. Apparatus according to claim 1, wherein said last-named means include:

means for resetting said bit counter; and means for incrementing said terminal counter by a fixed count.

5. Apparatus according to claim 1, wherein said last-named means further include:

gating means associated with each one of said terminal devices responsive to said control signal, for gating the contents of said assembly register to the selected one of said terminal devices.

References Cited by the Examiner

UNITED STATES PATENTS

| | | | |
|---|---|---|---|
| 2,973,507 | 2/1961 | Grondin | 340—164 |
| 3,154,770 | 10/1964 | Schwab et al. | 340—174.1 |
| 3,175,191 | 3/1965 | Cohn et al. | 340—164 |

ROBERT C. BAILEY, *Primary Examiner.*

P. L. BERGER, *Assistant Examiner.*